United States Patent [19]

Iwamoto et al.

[11] Patent Number: 4,935,603
[45] Date of Patent: Jun. 19, 1990

[54] HOT WATER SUPPLY SYSTEM

[75] Inventors: Keiichi Iwamoto; Kiyoshi Watanabe, both of Gunma, Japan

[73] Assignee: Sanyo Electric Co., Ltd., Osaka, Japan

[21] Appl. No.: 308,389

[22] Filed: Feb. 9, 1989

[30] Foreign Application Priority Data

Feb. 12, 1988 [JP] Japan .................. 63-31061

[51] Int. Cl.⁵ .............................. H05B 1/02
[52] U.S. Cl. ................................ 219/330
[58] Field of Search .......... 219/328, 330, 331, 310, 219/312, 316, 329, 334; 236/46 R, 47, 20 R; 237/8 R, 8 A

[56] References Cited

U.S. PATENT DOCUMENTS

| 1,996,625 | 4/1935 | Pendleton | 219/330 |
| 2,157,910 | 5/1939 | McCormick | 219/330 |
| 4,058,702 | 11/1977 | Jerles | 219/330 |
| 4,467,178 | 8/1984 | Swindle | 219/330 |
| 4,508,261 | 4/1985 | Blank | 236/46 R |
| 4,511,790 | 4/1985 | Kozak | 219/331 |
| 4,682,279 | 7/1987 | Watabe | 236/46 R |
| 4,737,615 | 4/1988 | Stipe | 219/330 |

FOREIGN PATENT DOCUMENTS

| 49-39965 | 11/1974 | Japan . | |
| 228848 | 11/1985 | Japan | 219/334 |
| 2132791 | 7/1984 | United Kingdom | 236/20 |

Primary Examiner—A. D. Pellinen
Assistant Examiner—Geoffrey S. Evans
Attorney, Agent, or Firm—Darby & Darby

[57] ABSTRACT

A hot water supply system having a plurality of electric heaters arranged at vertically displaced positions in the hot water tank, and a controller for controlling the temperature of the water based on the signal supplied by a plurality of water-temperature sensors, by controlling the electric currents through the heaters in three different modes in such a way that the upper and lower heaters are turned on individually in a first mode; only the upper heater is turned on in a second mode; and only the upper heater is turned on at a low preset temperature in a third mode to prevent the water from freezing, supplying necessary and sufficient amount of hot water from the upper portion of the tank and feeding water from the lower portion of the tank, the system providing efficient electric current control of the heater depending upon the demands and ambient temperature conditions, thereby allowing efficient utilization of energy and making the hot water supply system superb.

4 Claims, 12 Drawing Sheets

FIG. 5

| MODE | ERECTRIC HEATER | PRESET TEMPERATURE | TEMPERATURE DISPLAY |
|---|---|---|---|
| NORMAL | UPPER / LOWER | 15~70 °C | UPPER PART |
| ENERGY - SAVING | UPPER | 15~70 °C | UPPER / LOWER PART |
| MAX. ENERGY-SAVING | UPPER | 15 °C | UPPER / LOWER PART |

HOT WATER SUPPLY SYSTEM

FIELD OF THE INVENTION

The invention relates to a hot water supply system for supplying hot water to a kitchen, bath rooms and the like, in particular to such system for controlling the electric heaters provided in the hot water tank.

BACKGROUND OF THE INVENTION

Most widely used conventional hot water supplies of this kind have therein one electric heater heated by controllable electric current is. See for example, U.S. Pat. No. 4,461,949, which discloses an electrically controllable electric heater in the boiler. Since such hot water supply systems must heat the whole water in the tanks by single heater, they have disadvantages that the heaters must have large heating values and that they take long time to heat the water even to a lower preset temperature, yet consuming large amount of electric energy. There have been, therefore, proposed improvements in supplying hot water economically with less electric powder. For example, Japanese Utility Model Publication No. 49(1974)-39965 discloses a storage-type hot water supply system having a main heater that utilizes night-time electric power and a sub-heater that utilizes daytime electric power. The system stores at a predetermined temperature the hot water heated by the main heater at night and heats the water fed into the tank during daytime by means of the latter heater. With this constitution, it is possible to prevent lowering of the temperature of the water in the tank after if is used and fed with new water, utilizing ecomomic night electricity to boil the water to minimize the heating cost. Yet, this hot water supply is incapable of adjusting itself to varying conditions such as the consumption rate of the hot water and ambient temperature. Since the consumption of the hot water varies from time to time in a day, it is desirable from a point of convenient utilization of economic night electricity to have the heating value (calorific value) increased during the hours of large consumption but decreased during the hours of low consumption. Further, it is most desirable to have a minimum calorific value sufficient to prevent the water from freezing during winter-night when ambient temperature is lower and no hot water is used, as well as during a long non-using period, for example vacation. Thus, the control of electric heating for a hot water supply system that can meet the varying conditions of consumption and temperature will be needed for effective and convenient hot water supply, which have not been realized yet so far in prior art including the aforementioned publication and other U.S. patents.

BRIEF SUMMARY OF THE INVENTION

The invention is directed to solve the above mentioned problems encountered in prior art. Therefore an object of the invention is to provide a hot water supply system capable of heating the water in the tank with a mimimum amount of electricity by controlling the electricity for the heater depending on the consumption of the hot water and other conditions such as an ambient temperature. Another object of the invention is to provide a convenient hot water supply system that can be run in three different modes of heating in a preferred combination, which is easily programmable in accordance to the desired heating load, thereby providing a superb hot water supply system.

The hot water supply system according to the invention comprises: a hot water tank; a water feeding pipe for feeding water into the lower part of the tank; a plurality of electric heaters arranged at vertically displaced positions in the tank for heating the water; a plurality of temperature sensors also arranged at vertically displaced positions in the tank for detecting the temperatures of the water; a controller for controlling the electric currents passing through the electric heaters based on the signals given by the temperature sensors; a hot water supply pipe provided on top of the tank for taking hot water out of the tank. The controller controls in three different modes the electric current through the upper electric heater based on the signal given by the upper temperature sensor and the electric current through the lower electric heater based on the lower temperature sensor in such a way that, in a first mode of control, the upper and the lower electric heaters are not turned on simultaneously, and in a second mode only the upper electric heater is turned on based on the signal given by the upper temperature sensor, and in a third mode only the upper heater is turned on based on the signal given by the upper temperature sensor at a temperature lower than the previously preset in the controller. With this constitution it is possible in the first mode, by turning on both the upper and the lower electric heaters, but not simultaneously, to heat the water in the tank with less electric power in a relatively short period of time under a normal condition where relatively large amount of hot water is used. The water newly fed in the tank after hot water is consumed is heated quickly by either heater so that the water in the tank may be (always) maintained at the desirable temperature. On the other hand when hot water is used only a little, the second mode is chosen to heat only the upper heater, which is good enough for storing hot water in the upper region of the tank with a little electricity. Further, during a cold winter night or during a long period of absence, e.g. vacation when no hot water is used, the third mode is chosen to control the upper electric heater only for keeping the water at a sufficiently low temperature. This permits saving of great amount of electricity while keeping the water in the tank free of being frozen, and yet ready for quick resumption. The controller preferably comprises a manual control elements such as control switches, control circuits such as microprocessors, display elements such as temperature displays, and an electric powder supply, so that it is possible with these elements to set a one-week electric current control program which may govern the daily timed control of the electric currents by presetting the temperatures to be present in the controller and by setting a preferred sequence of the electric current modes. The manipulation of the elements in setting or changing the control is simple. The microprocessor makes it also possible to perform complex heating controls daily (including mode changes) over a week. Hence, the user may enjoy an easy and most economical hot water supply according to his weekly schedule.

BRIEF DESCRIPTION OF THE DRAWINGS

FIG. 5 is a chart showing the content of the modes of the electric current control for the heater.

DETAILED DESCRIPTION OF THE PREFERRED EMBODIMENT

Figure 1:
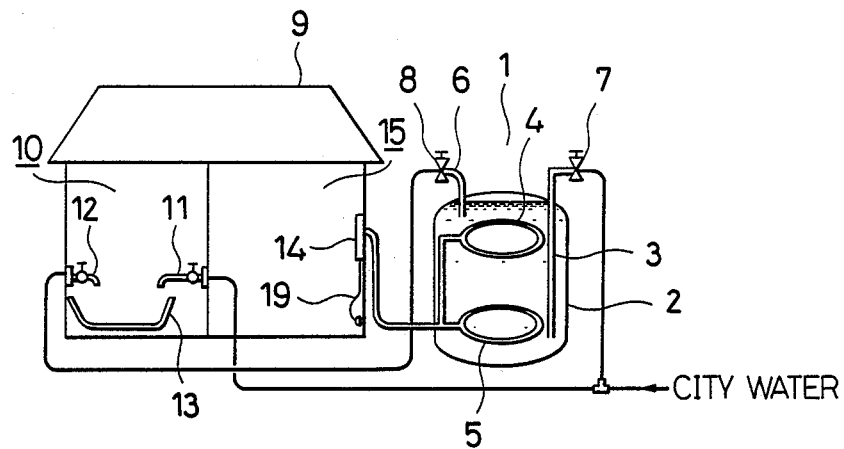
FIG. 1 illustrates a house which is provided with a hot water supply system according to the invention.
Figure 2:
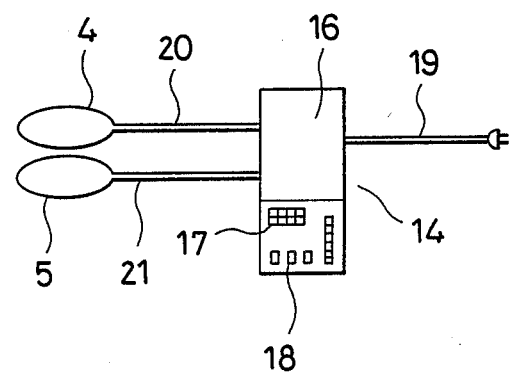
FIG. 2 is a schematic diagram of the hot water supply system.
Figure 3A:
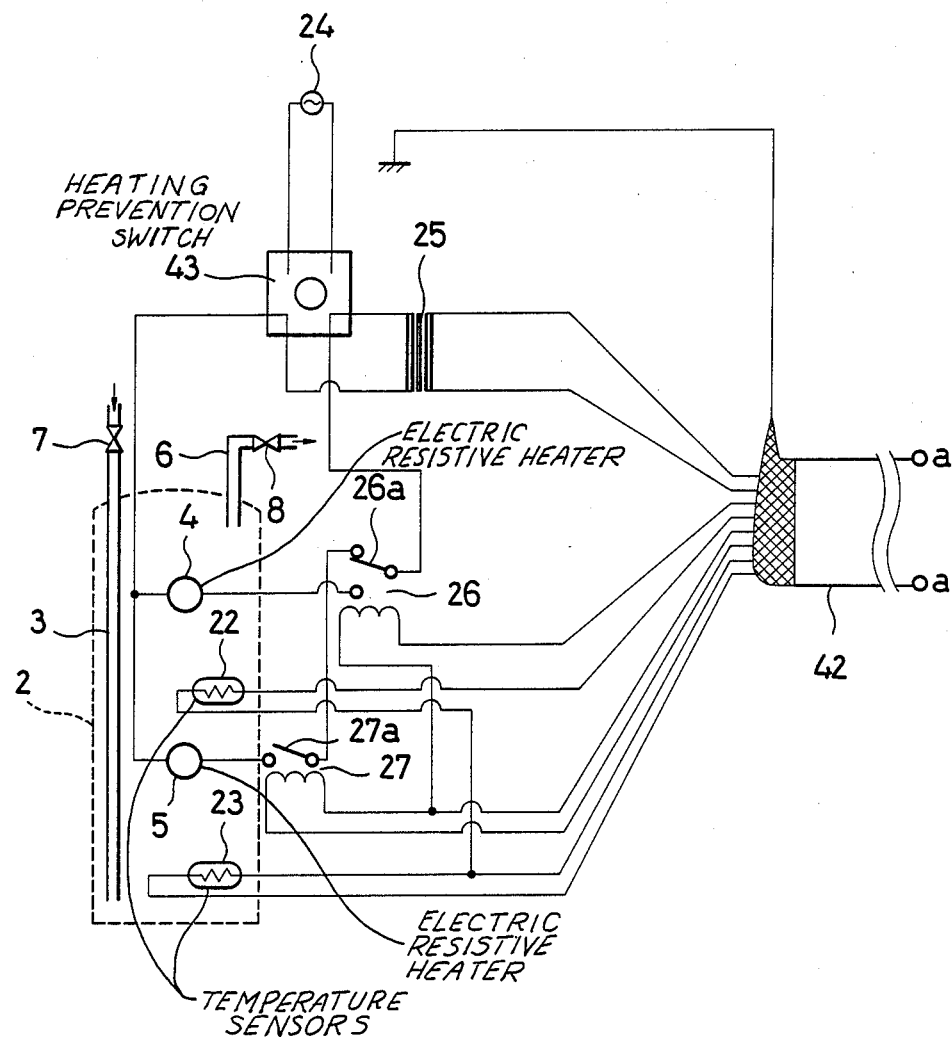
FIGS. 3a and b show a schematic electric circuit for the whole hot water supply system.
Figure 3B:
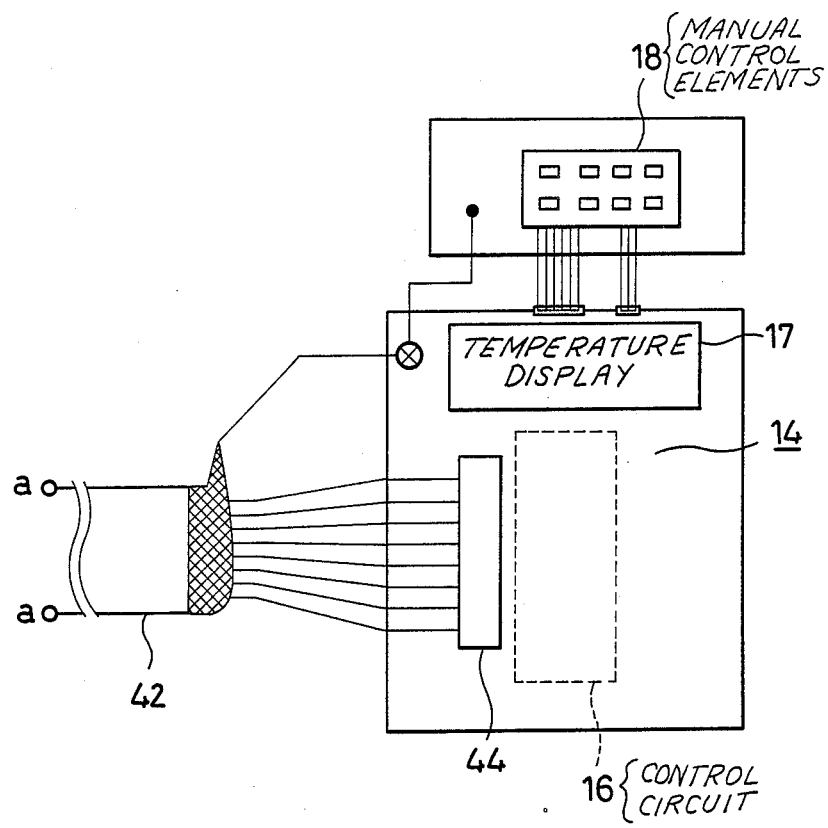
Figure 4:
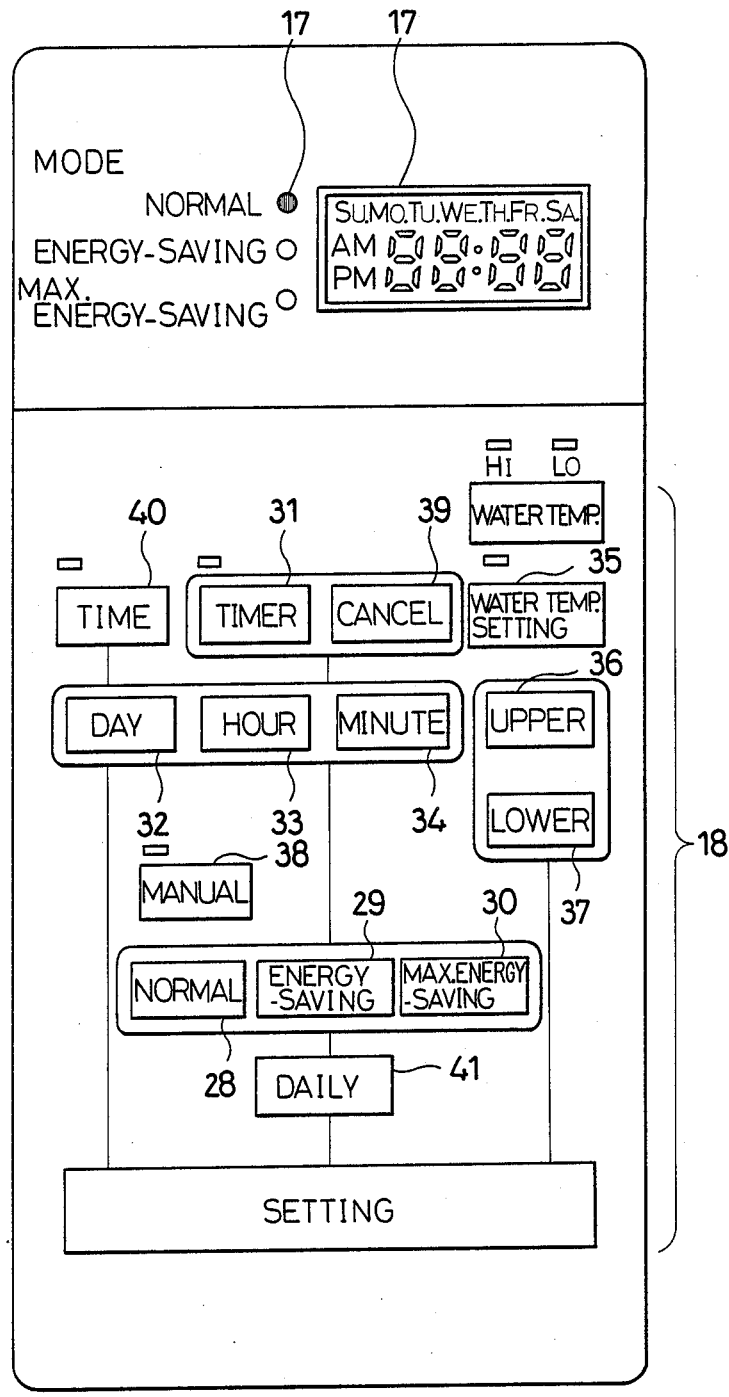
FIG. 4 is a front view of the hot water supply system.

Referring now to FIGS. 1 through 12 the invention is described in detail. In FIG. 1, a hot water supply sytem 1 comprises a hot water tank 2, a water supply pipe 3 for supplying city water to the lower portion of the tank, two electric heaters 4 and 5 arranged at vertically displaced positions for heating the water in the tank 2, and a hot water pipe 6 mounted at the upper portion of the tank 2 for drawing the hot water therefrom. A hot water value 8 is mounted in the hot water pipe 6. In the house 10 are a water faucet 11 for directly supplying city water into the bath room 10, a hot water faucet 12 for supplying the hot water from the hot water tank 2 through the hot water pipe 6, and a bath tub 13 for storing the water and/or hot water fed from the faucets 11 and 12. A controller 14 for controlling said hot water supply system 1 is provided in a room 15 of the house 9. As shown in FIG. 2, this controller 14 is provided with a control circuit 16 such as a microprocessor, a temperature display 17, various manual control elements 18 such as buttons and switches, an electric cord 19 for supplying electric power and connection cord 20 and 21 for connection with electric heaters 4 and 5. At upper and lower positions in the hot water tank 2, temperature sensors 22 and 23 are provided. The temperature sensor 22 detects the temperature of the hot water in the upper portion of the tank to control the electricity of the upper heater 4, while the lower temperature sensor 23 detects the temperature of the water in the lower portion of the tank to control the lower electric heater 5. The electric heaters 4 and 5 and the temperature sensors 22 and 23 are, as shown in FIGS. 3a and 3b, are electrically connected with the controller 14 through a shielded wire 42. The upper electric heater 4 is connected with a primary winding of a transformer 25 via a relay contact 26a of a relay 26 which turns ON and OFF the heater 4. On the other hand the lower heater 5 is connected with the primary winding of the transformer 25 via said relay contact 26a and a relay contact 27a of a relay 27 which turns ON and OFF the heater 5. The transformer 25 is supplied with electric power from the power source 24 via an over heating prevention switch 43. The controller 14 conducts the following three types of control by means of said circuit 16. Firstly, it controls the current of both the upper and lower heaters 4 and 5 independently. In actual operation they are heated alternately to heat the water in the tank (the mode of which is hereinafter referred to as normal mode). Secondly, it turns on only the upper heater 4 to heat the upper part of the tank water (the mode of which is hereinafter referred to as energy-saving mode). Thirdly, it turns on the upper heater 4 only in a controlled manner, lowering the temperature of the water to a preset temperature (which is almost the temperature of cold water) preset in the control circuit 16 (the mode of which is hereinafter referred to as maximum-energy saving mode). These control modes can be selected by appropriate manipulation of the button switches on the manual control elements 18.

To describe the modes further, in the normal mode the temperature of the water in the tank is detected with the upper temperature sensor 22, and, based on the comparison of the detected temperature and the preset temperature stored in the controller 14, ON-OFF operation of the upper heater 4 is controlled. At the same time the temperature of the lower part of the tank water is detected with the temperature sensor 23, which is compared with the preset temperature stored in the controller 14 to control the ON-OFF operation of the heater 5, the thereby maintain the upper and lower part water at prescribed temperatures. Even when the upper and lower electric heaters 4 and 5 can be both turned on, only the upper electric heater 4 is turned on with a priority to the heater 5 based on an instruction given by the control circuit 16 and not both of them are turned on simultaneously, to prevent an excessive electric current (through the system), yet a sufficient amount of hot water may be available first in the upper part of the tank 2 for immediate use. In the normal mode under such control as mentioned above, the hot water is eventually maintained at a uniform preset temperature in the hot water tank 2. The temperature shown on the display 17 is the temperature of the upper part water detected by the upper temperature sensor 22.

In the energy-saving mode, the upper temperature sensor 22 detects the upper part water in the hot water tank 2, which is compared with the preset temperature stored in the controller 14 to undergo the ON-OFF control of the upper electric heater 4 to maintain only the upper part water at the prescribed temperature. This is based on the assumption that in this mode a relatively small amount of water is used that only upper part water heated at a preset temperature will suffice. In this case the display 17 alternately shows the temperature detected by the upper temperature sensor 22 and the temperature detected by the lower temperature sensor 23, so that the temperature distribution in the hot water tank 2 can be monitored.

In the maximum-energy-saving mode, the upper temperature sensor 22 detects the temperature of the upper part water in the tank 2 as in the energy saving mode. The detected temperature is compared with the preset temperature stored in the controller 14 to carry out ON-OFF control of the upper electric heater only, for which the preset temperature is lower (e.g. 15° C.) than that for the energy-saving mode. In this mode it is assumed that the hot water supply system is not used over a relatively long period of time, e.g. a winter night or several days of absence. The mode is intended to prevent the water in the hot water tank 2 from being frozen and to allow quick resumption of heating the water when needed. The display 17 also alternately displays the temperatures detected by the upper and lower temperature sensors 22 and 23.

The controller 14 comprises in its control circuit 16 the following functions operable in response to the button switches on the manual control elements 18. They are: a function that undergoes either one of the three modes through the selection of corresponding button switches 28, 29, or 30 (shown in FIG. 4 as "Normal", "Energy-saving", and "Maximum-energy-saving"); a function that establishes the prescribed sequence of the three modes in a preferably timed fashion several times each day over a week, distributing electricity to the electric heaters 4 and 5, by means of button switches 31, 32, 33, or 34 (shown in FIG. 4 as "Timer", "Day", "Hour", and "Minute"), a function for setting the preset temperature in the above mentioned timing program for the controller 14 by means of buttons 35, 36, and 37 (shown in FIG. 4 as "Water Temperature Setting", "Upper", and "Lower"); a function for undergoing the heating of the electric heaters 4 and 5 with a priority to the programmed schedule until the program cancellation is instructed by a button switch 39 if a button switch 38 (shown in FIG. 4 as "Manual") is pressed, a function for setting time by means of a button switch 40 (shown in FIG. 4 as "Clock"). Based on these functions the display 17 selectively displays the temporary mode, time, programmed time, preset temperature, and present water temperature.

Figure 6A:
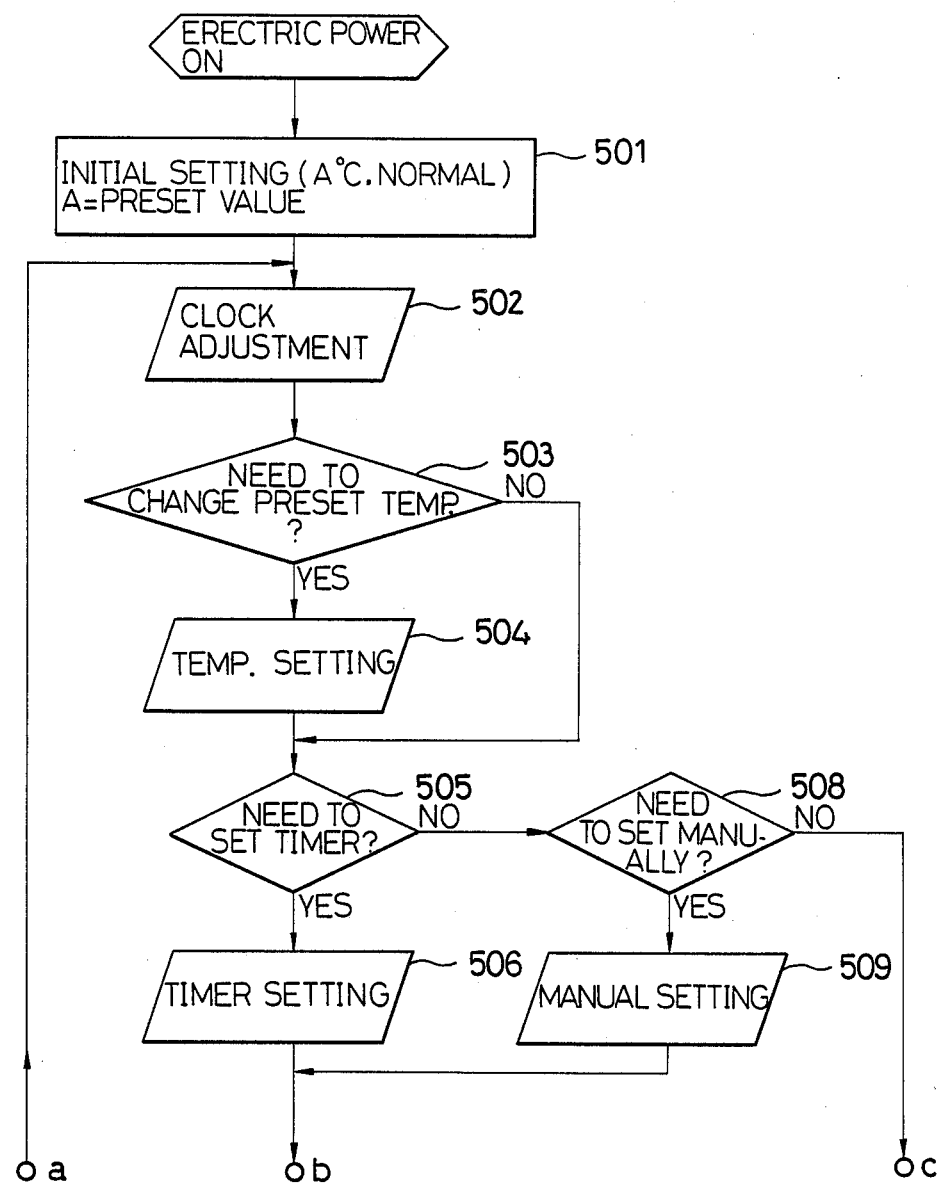
FIGS. 6a and b show a flowchart of the control in the entire hot water supply system.
Figure 6B:
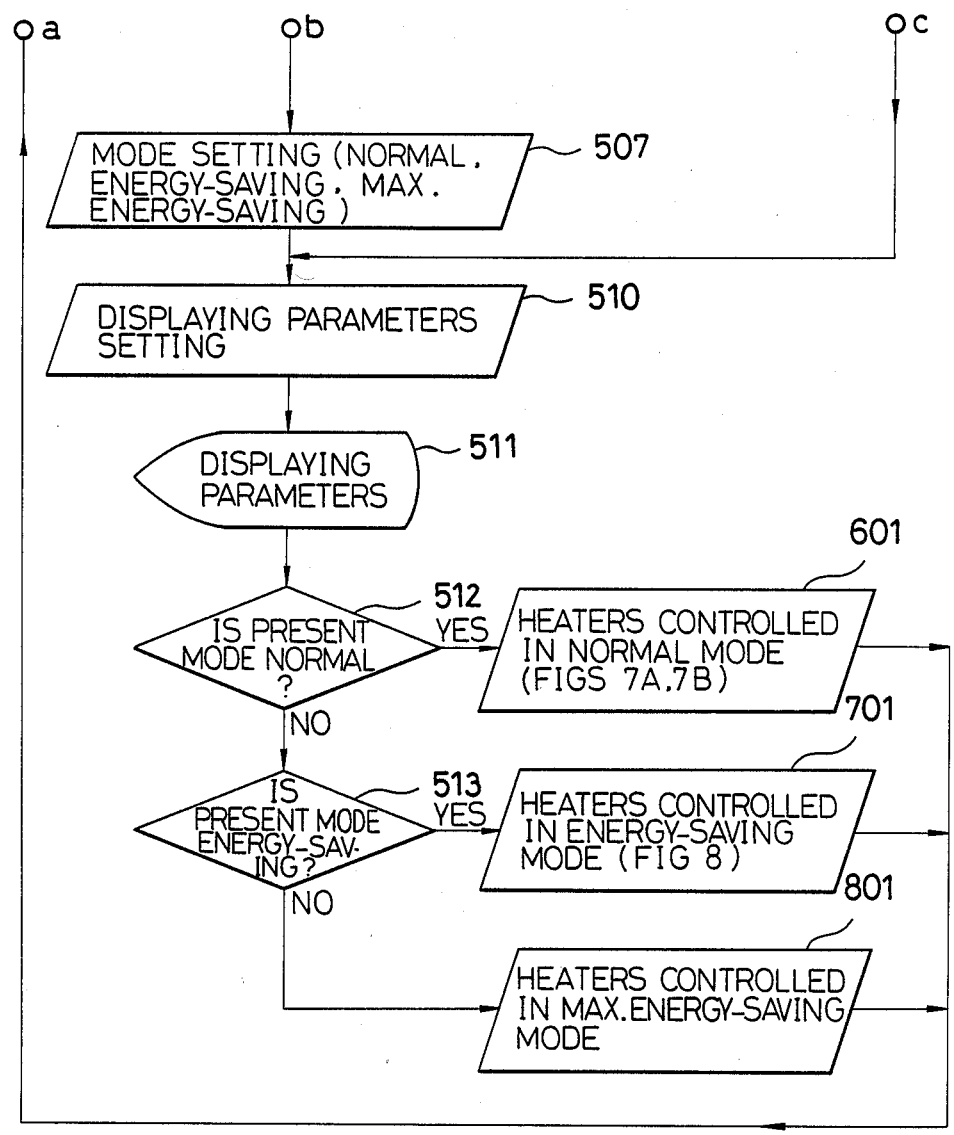
Figure 7A:
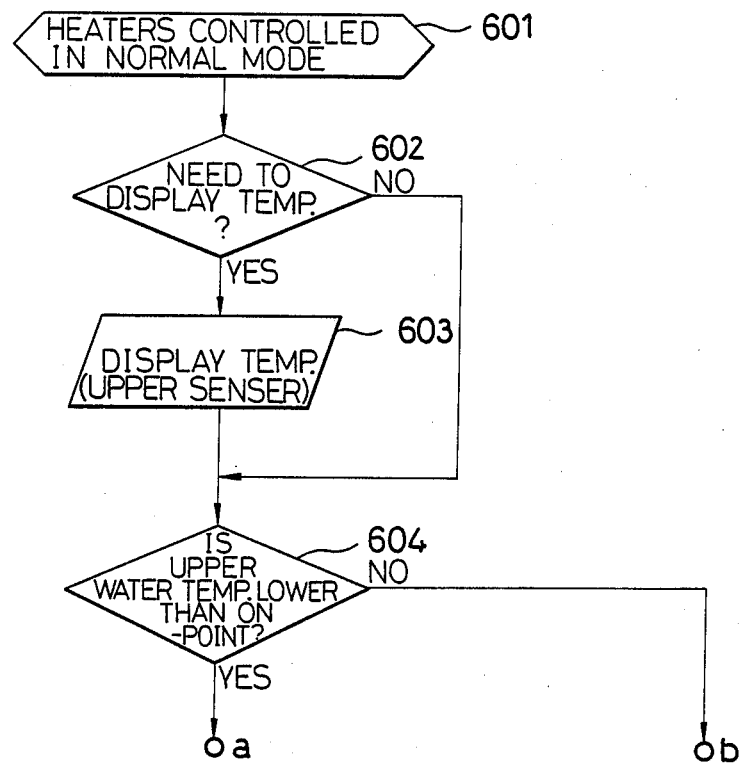
FIGS. 7a and b show a flowchart of the control in the electric current modes.
Figure 7B:
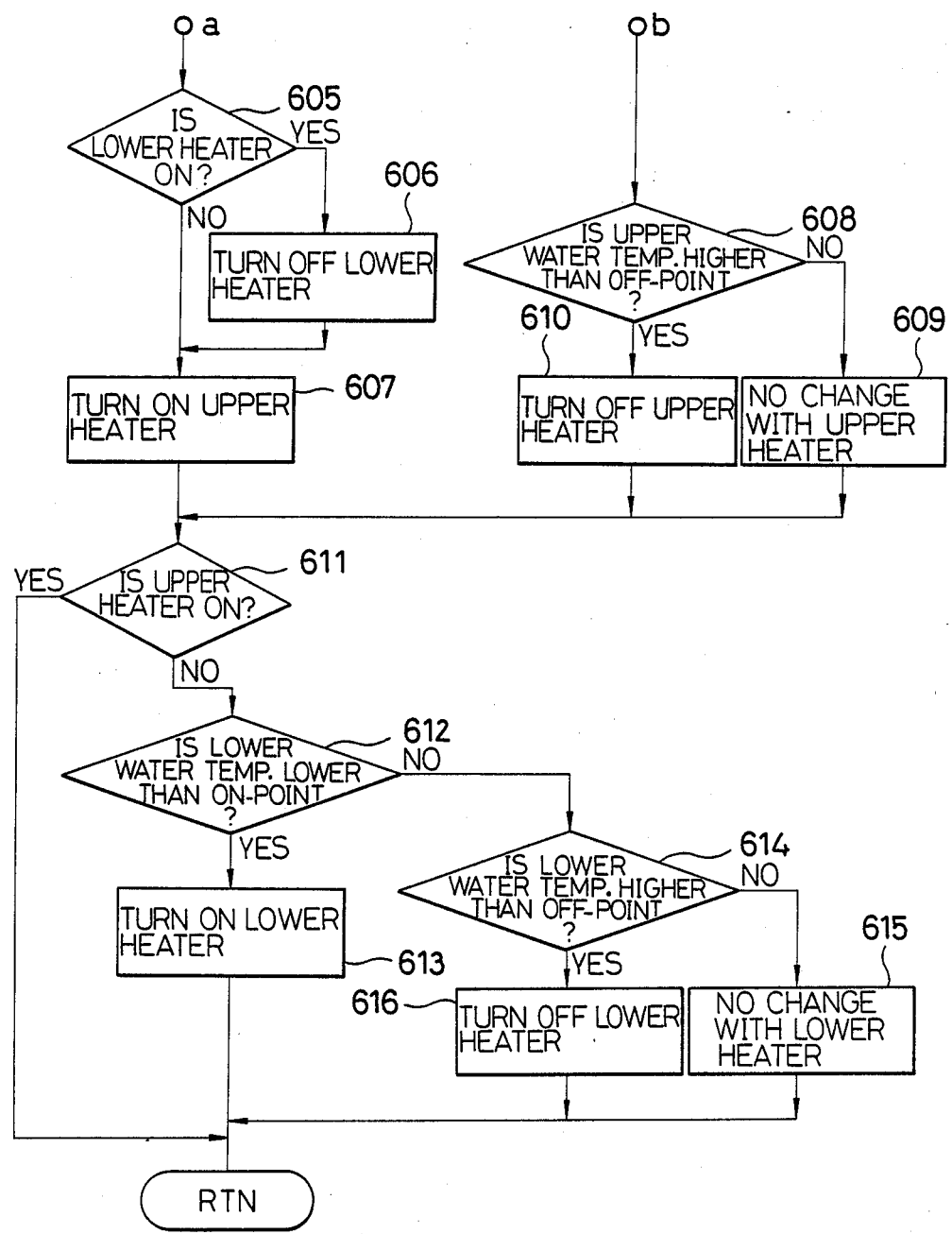
Figure 11:
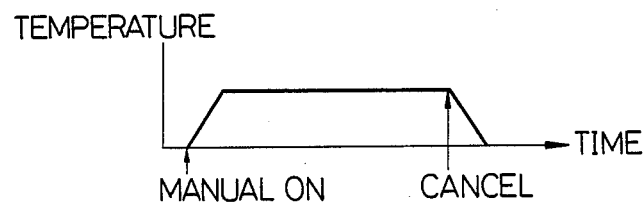
FIG. 11 is an example of a time chart manual setting.

Referring to the flowcharts shown in FIG. 6 through FIG. 9 the operation of the hot water supply system and the controller thereof having the above constitution will now be described. FIGS. 6a and 6b show an overall flowchart, in which the water temperature in the normal mode is preset (process 501) as the initialization as the power source of the system is turned ON. Next, heating times are set (process 502), a decision made of any changes (decision 503) in the already preset temperatures, and if any, necessary changes are made (process 504), a decision is made if the timer is to be set (decision 505). If the timer is to be set, then the times are set (process 506) as well as the modes (comprising normal, energy-saving, and maximum-energy-saving-mode) (process 507). If the timer is not to be set (decision 508), but times is to be set manually (process 509), only the modes are set (process 507). Further, if no timer setting or manual setting is not made, the control process proceeds to the next steps that follow in the chart. The parameters to be displayed on the display 17 are next set (process 510). After the parameters are displayed (process 511), the system is checked if it is in operation under the normal mode or not (decision 512). If it is, the normal mode is continued as shown in FIGS. 7a and 7b (process 601), while, if it is not, the system is examined if it is in the energy-saving mode or not (decision 513). If it is, the energy-saving mode is continued (process 701), while, if it is not, the mode is switched to the maximum-energy-saving mode shown in FIG. 9 (process 801). The control process then returns to the step of clock adjustment (process 501). Thus, with the timer set as described above as shown in FIG. 10, it is possible to preset the modes beforehand. For example, the system may assume the normal mode from AM 6:00–AM 12:00, the energy-saving mode from AM 12:00–PM 4:00, again the normal mode from PM 4:00–PM 11:00, and maximum-energy-saving mode from PM 11:00–AM 6:00, and similar mode variations over a week. With a button switch 41 (shown in FIG. 4 as "Daily") pressed down, such mode setting may be repeated everyday. On the other hand, through a manual setting it is possible to maintain water at a hot temperature in the tank until an instruction is given to cancel the setting, as shown in FIG. 11.

FIGS. 7a and 7b together show a flowchart for the normal mode, in which the temperature of the water detected by the upper temperature sensor is displayed on the display 17 (process 603) after the normal mode is set (process 601). Next, this temperature is compared with the preset temperature at which the upper electric heater is to be turned ON (which will be hereinafter referred to as ON-point) (decision 604). If the temperature is lower than the preset ON-point, it is checked if the lower electric heater 5 is turned ON or not (decision 605) and, if it is ON, the heater 5 is turned OFF (process 606) and the upper electric heater 4 is turned ON (process 607).

On the other hand, if the upper part temperature is higher than the preset ON-point (process 608), it is then compared with the preset temperature at which the upper electric heater is to be turned OFF (which will be hereinafter referred to as OFF-point). If it is lower than the OFF-point, the upper heater 4 is kept ON as it is (process 609), while, if it is higher than the OFF-point, then the upper electric heater 4 is turned OFF (process 610).

In the next step, the upper electric heater is checked if it is ON or not (decision 611). If it is ON, then the process returns to the clock adjustment (process 502) of FIGS. 6a. On the other hand if the upper electric heater 4 is OFF, then the temperature of the lower part water in the tank is compared with the preset ON- and OFF-points (decision 614). If it is lower than the OFF-point, the lower electric heater 5 is kept ON (process 615), but if it is higher than the OFF-point, the heater 5 is turned OFF (process 616). After these processes control returns to the clock adjustment (process 502) again, repeating the same processes afterward. In this manner, both the upper and lower heaters 4 and 5 are individually turned ON in the normal mode to keep constant the temperatures of the upper part and lower part water in the tank 2. In this case, both heaters 4 and 5 are not turned ON simultaneously as described above.

Figure 8:
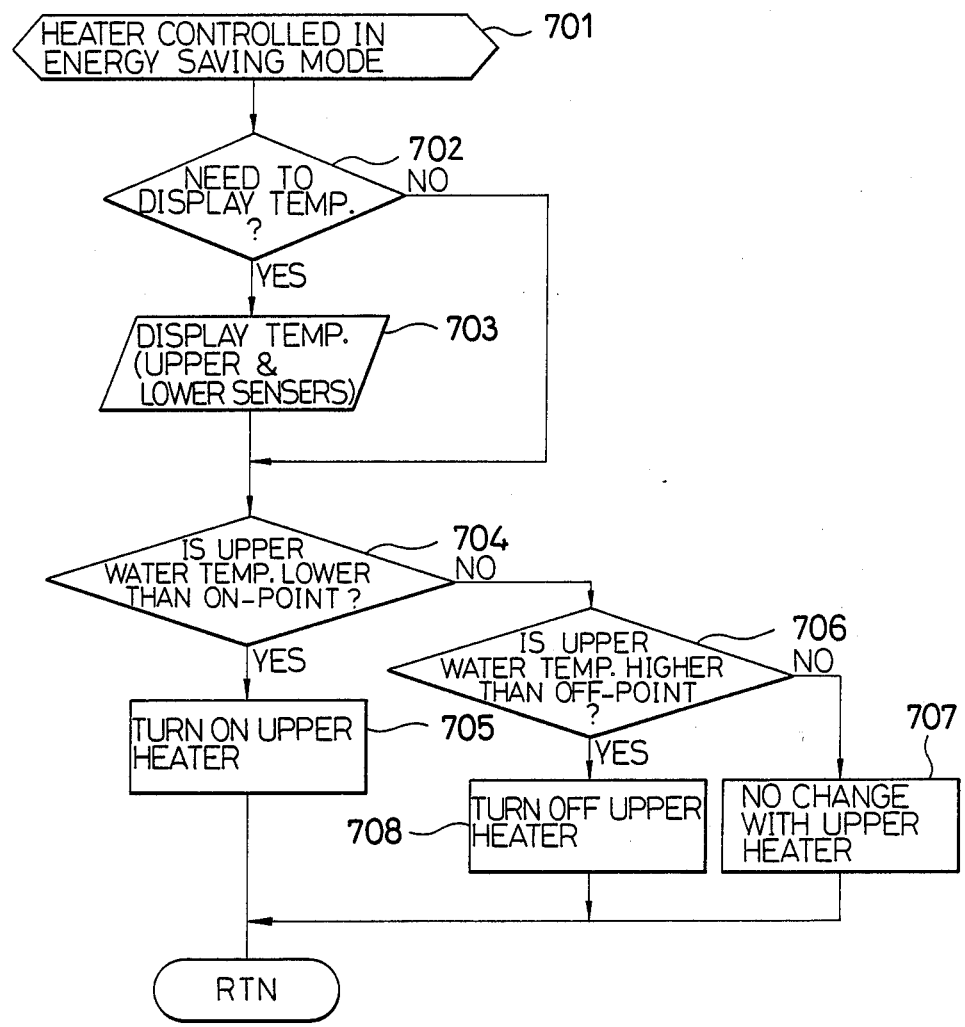
FIG. 8 is a flowchart of the control for the energy-saving electric current mode.

In the flow as shown in FIGS. 7a and 7b water is fed into the lower part of the tank 2 when a large amount of hot water was used. In this case, the temperature of the upper part water is compared with the preset ON-point and, if the water temperature is lower than the ON-point, the upper heater 4 is preferentially turned ON to make at least the upper part water hot quickly, preventing the whole water from becoming uniformly cooled and becoming unable to supply hot water and giving the users incoveniences. FIG. 8 is a flowchart for the energy-saving mode, in which only the upper electric heater 4 is turned ON. Namely, a decision is made if the temperature is to be displayed (process 702). The temperature of the upper part water in the tank 2 is compared with the preset ON-point (decision 704) immediately if the temperature is not displayed, but following the display (process 703) if the temperature is displayed, and the heater 4 is turned ON (process 705) if the water temperature is lower than the ON-point, and is compared with the OFF-point (process 706) if the water temperature is higher than the ON-point. If the water temperature is lower than the OFF-point, then the heater 4 is kept ON as it is (process 707), but the heater 4 is turned OFF (process 708) if the water temperature is higher than the OFF-point. After these processes the control returns to the clock adjusting (process 502) of FIG. 6a and repeats a similar flow.

Figure 9:
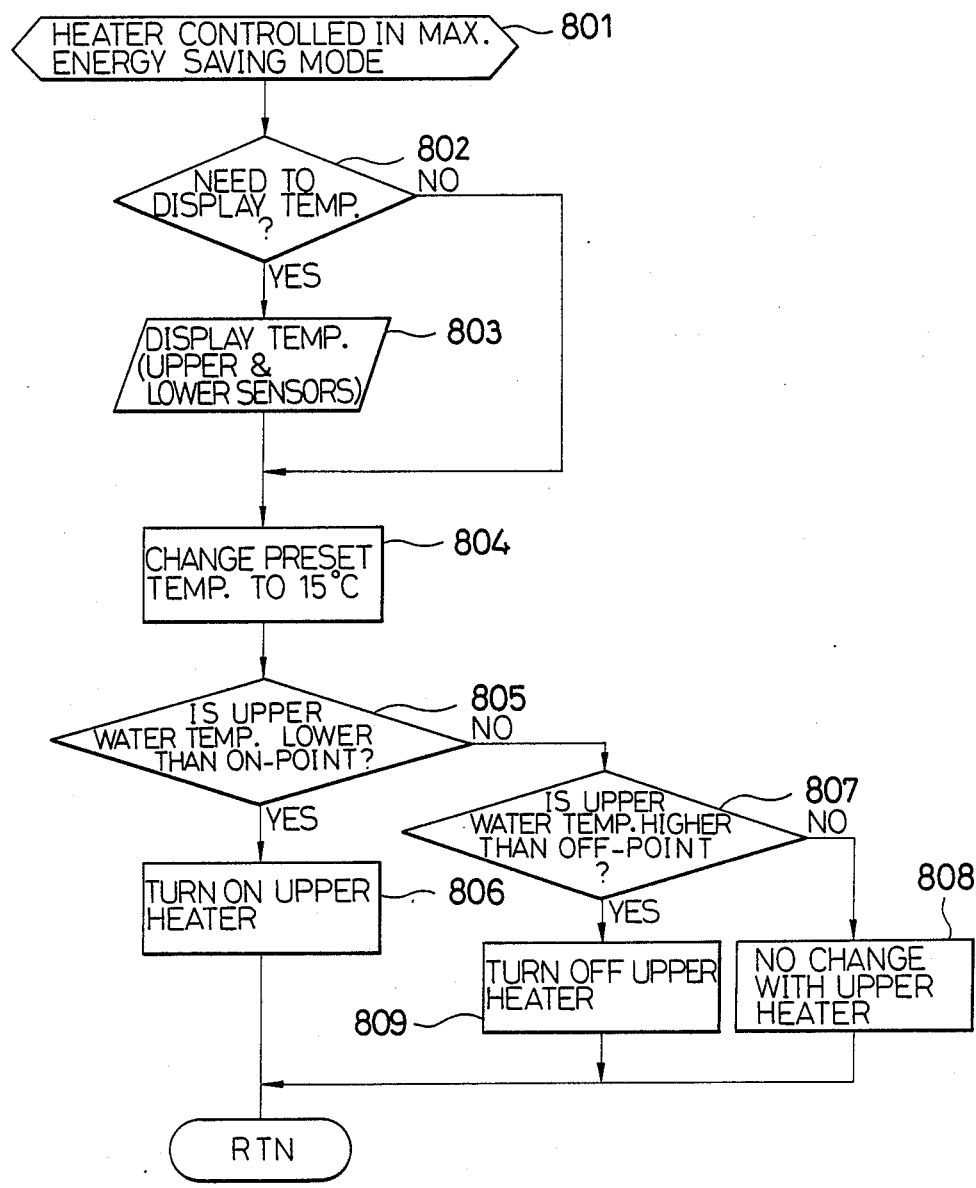
FIG. 9 is a flowchart of the control in the maximum-energy-saving mode.
Figure 10:
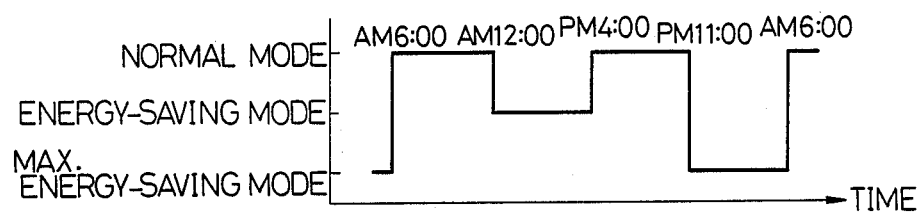
FIG. 10 is an example of a time chart for timer setting.

FIG. 9 is a flowchart for the maximum-energy-saving mode, in which only the upper heater 4 is placed to the ON-OFF control after preset temperature is lowered below, for example, 15° C. The control operation of this mode is the same as that for the energy-saving mode shown in FIG. 8.

Namely, a decision is made (decision 802) if the temperature display is to be made, and the preset temperature of the water in the tank 2 is altered (process 804) to a lower temperature (say 15° C.) immediately if the temperature is not displayed, but after the display (process 803) if the temperature is to be displayed. Next, the temperature of the upper part water in the tank 2 is compared with the preset ON-point (decision 805). If the temperature is lower than the ON-point, the upper electric heater 4 is turned ON (process 806), while, if the temperature is higher than the ON point, it is then compared with the OFF-point (decision 807). If the temperature is lower than the OFF-point, the upper electric heater 4 is kept ON as it is (process 808), and turns OFF the heater 4 (process 809) if the temperature is higher than the OFF-point (process 809). After these processes the control returns to the clock adjustment (process 502) to repeat a similar flow.

Figure 12:
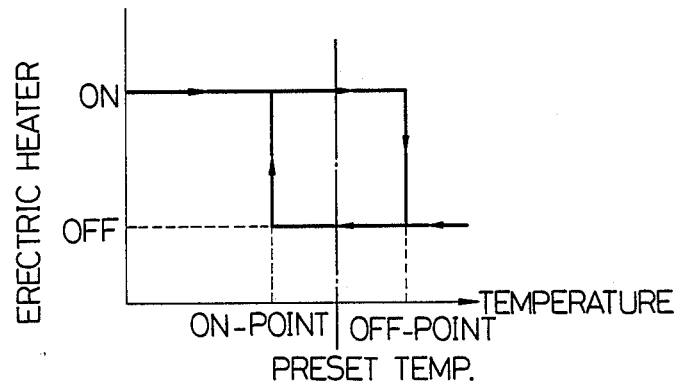
FIG. 12 is an illustration showing the relationship between ON-OFF operations of the electric heaters and the present temperatures.

FIG. 12 is an illustration showing the relationship between the ON- and OFF preset temperatures and the ON-OFF operations of the heaters 4 and 5, illustrating the variation of the ON and OFF operations of the heaters 4 and 5 in the region between the upper and lower temperatures which have been set in reference to the preset temperature.

What we claim is:

1. A hot water supply system comprising: a hot water tank; a water supply pipe for supplying water into the lower part of the tank; a plurality of electric heaters arranged in vertically displaced positions in the tank for heating the water; a plurality of temperature sensors also arranged in vertically displaced positions in the tank for detecting the temperatures of the water; a controller for controlling the electric currents passing through the electric heaters based on the signals given by the temperature sensors; a hot water supply pipe provided on top of the tank for taking hot water out of the tank, said controller having control of the electric current through the upper electric heater based on the signal given by the upper temperature sensor and of the electric current through the lower electric heater based on the signal given by the lower temperature sensor, said controller being capable of operation in three modes, the three modes including a first mode in which one of the upper and the lower electric heater is turned on in response to the associated sensor, but not both simultaneously, a second mode in which only the upper electric heater is turned on based on the signal from the upper temperature sensor, and a third mode in which only the upper electric heater is turned on based on the signal given by the upper temperature sensor and a preset temperature which has been previously preset in the controller, said preset temperature being lower than temperatures set for hot water in the first and second modes.

2. A hot water supply system according to claim 1, wherein said controller comprises manual control switches for control of operation, a control circuit, display means for displaying control parameters, and an electric power supply, by means of manual operation of the manual control switches, preset temperatures in the controller are selectable, and a combination of the three modes for water heating over a one week period may be selected, which combination governs the timed control of the electric currents through the heaters on a daily basis.

3. A hot water supply system as in claim 1, wherein the upper heater is turned on in said first mode when said sensors indicate a need for electric current in both heaters, operation of said upper heater getting priority over operation of said lower heater.

4. A hot water supply system as in claim 2, wherein temperature is a displayed parameter.

* * * * *